UNITED STATES PATENT OFFICE.

BRUNO RICHARD SEIFERT, OF DRESDEN, GERMANY, ASSIGNOR TO DR. F. VON HEYDEN NACHFOLGER, OF RADEBEUL, GERMANY.

PARAPHENETIDIN SUCCINIC ACID AND PROCESS OF MAKING SAME.

SPECIFICATION forming part of Letters Patent No. 563,076, dated June 30, 1896.

Application filed February 27, 1896. Serial No. 581,044. (Specimens.) Patented in England July 27, 1895, No. 14,331.

*To all whom it may concern:*

Be it known that I, BRUNO RICHARD SEIFERT, of Dresden, in the Kingdom of Saxony, German Empire, have invented a new class of Medical Compounds and a Process of Preparing the Same, of which the following is a specification, and for which I have obtained a patent in Great Britain, No, 14,331, dated July 27, 1895.

The dicarbon acids of the fatty series, for instance, succinic acid and its dioxy derivate, tartaric acid, are, in the presence of paraphenetidin (paramidophenetol) capable of forming a variety of compounds which are of the nature of anilides and of which those in which the free carbon acid groups are still present, yield extremely useful medicinal substances, owing to their great solubility in water, and also owing to their property of forming very readily soluble salts. These new substances, which, with the within-described process of producing them, form the subject of this invention, may be described as follows and expressed by the following formulæ:

Paraphenetidin succinic acid,

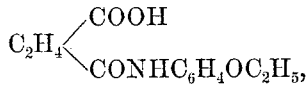

and the dioxy substitute therefor—viz., paraphenetidin tartaric acid

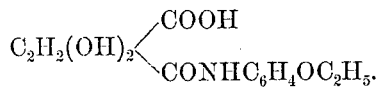

The following is an example of the course to be adopted in preparing these new substances:

A mixture of one molecular porportion of rather more of the acid to be dealt with and of one molecular proportion of paraphenetidin is heated for a number of hours to a temperature of about 150° centigrade. An example of a suitable mixture is fifty-five (55) parts by weight of tartaric acid, or forty-five (45) parts by weight of succinic acid, and forty-one (41) parts by weight of paraphenetidin.

The product of the reaction is boiled with a soda solution. From the solution obtained and by the addition thereto of suitable mineral acids, as muriatic or sulfuric acid, there is precipitated either phenetidin tartaric acid or phenetidin succinic acid. The product is purified by crystallization, that is, separated from the water. Each of the substances dissolves comparatively readily in cold water, and with great readiness in hot water, more readily in alcohol, and still more readily in soda solution. The phenetidin tartaric acid forms small almost colorless or slightly grayish scales or single crystals, the point of fusion of which is 195° centigrade. .4095 grams require for neutralization 14.9 cubic centimeters of decinormal soda solution instead of 15.2 cubic centimeters for

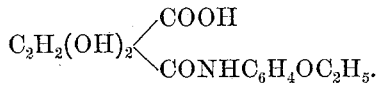

The phenetidin succinic acid forms almost colorless or slightly-grayish scales or single crystals, the melting-point of which is from 163° to 164° centigrade.

.3385 grams require for neutralization 14.8 cubic centimeters of decinormal soda solution. 14.3 cubic centimeters will be required for the formula:

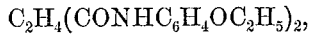

The raw materials used in the above process should be very thoroughly mixed, as otherwise it will be found, after boiling with soda, that there remains behind an undissolved residue of the diphenetidin, thus, $$C_2H_4(CONHC_6H_4OC_2H_5)_2,$$

or $$C_2H_2(OH)_2(CONHC_6H_4OC_2H_5)_2.$$

A liberal yield of these diphenetidin substances will be obtained by including in the above recipe two molecular proportions of phenetidin, and they will melt at 156° centigrade and 265° centigrade, respectively, but are with great difficulty soluble in water and are insoluble in soda solution and offer no advantages for pharmaceutical or medicinal purpose over other agents belonging to the same group or series.

By being melted with succinic acid or tartaric acid they are converted into phenetidin succinic acid or phenetidin tartaric acid, respectively. The said acids act medicinally as antipyretics and analgetics.

What I claim as my invention is—

1. The new acids herein described derived from the dicarbon acids of the fatty series and paraphenetidin having the form of almost colorless or slightly-grayish scales or single crystals, soluble in water, more readily in alcohol and still more readily in alkaline lye or soda solution and with the latter solutions forming alkali-salts, and having fusing-points of 163° to 195° centigrade.

2. The within-described process of manufacturing the within-specified class of medical compounds consisting in first heating paraphenetidin with one of the dicarbon acids of the fatty series, next boiling the product of this reaction with soda solution and adding thereto a mineral acid, and finally purifying by crystallization the precipitate thus obtained.

In testimony that I claim the foregoing as my invention I have signed my name in presence of two subscribing witnesses.

BRUNO RICHARD SEIFERT.

Witnesses:
 PAUL ARRAS,
 HERNANDO DE SOTO.